(12) United States Patent
Fisher

(10) Patent No.: US 8,406,469 B2
(45) Date of Patent: Mar. 26, 2013

(54) SYSTEM AND METHOD FOR PROGRESSIVE BAND SELECTION FOR HYPERSPECTRAL IMAGES

(75) Inventor: Kevin Fisher, Greenbelt, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 386 days.

(21) Appl. No.: 12/838,600

(22) Filed: Jul. 19, 2010

(65) Prior Publication Data

US 2012/0076406 A1 Mar. 29, 2012

Related U.S. Application Data

(60) Provisional application No. 61/226,889, filed on Jul. 20, 2009.

(51) Int. Cl.
*G06K 9/00* (2006.01)
*G01J 3/40* (2006.01)
(52) U.S. Cl. .................. 382/103; 356/302; 356/303
(58) Field of Classification Search .................. 356/302, 356/303, 326, 416–420; 382/103–107
See application file for complete search history.

(56) References Cited

U.S. PATENT DOCUMENTS

| 7,733,484 | B1* | 6/2010 | Gupta et al. ............... 356/326 |
| 7,835,002 | B2* | 11/2010 | Muhammed et al. ........ 356/419 |
| 2006/0023948 | A1* | 2/2006 | Palmadesso et al. ......... 382/191 |
| 2010/0056928 | A1* | 3/2010 | Zuzak et al. ............... 600/476 |
| 2010/0329512 | A1* | 12/2010 | Nam et al. ................. 382/103 |
| 2011/0279682 | A1* | 11/2011 | Li et al. ..................... 348/169 |
| 2011/0292374 | A1* | 12/2011 | Schulenburg et al. ........ 356/51 |

* cited by examiner

*Primary Examiner* — Brian Le

(57) ABSTRACT

Disclosed herein are systems, methods, and non-transitory computer-readable storage media for progressive band selection for hyperspectral images. A system having module configured to control a processor to practice the method calculates a virtual dimensionality of a hyperspectral image having multiple bands to determine a quantity Q of how many bands are needed for a threshold level of information, ranks each band based on a statistical measure, selects Q bands from the multiple bands to generate a subset of bands based on the virtual dimensionality, and generates a reduced image based on the subset of bands. This approach can create reduced datasets of full hyperspectral images tailored for individual applications. The system uses a metric specific to a target application to rank the image bands, and then selects the most useful bands. The number of bands selected can be specified manually or calculated from the hyperspectral image's virtual dimensionality.

42 Claims, 11 Drawing Sheets

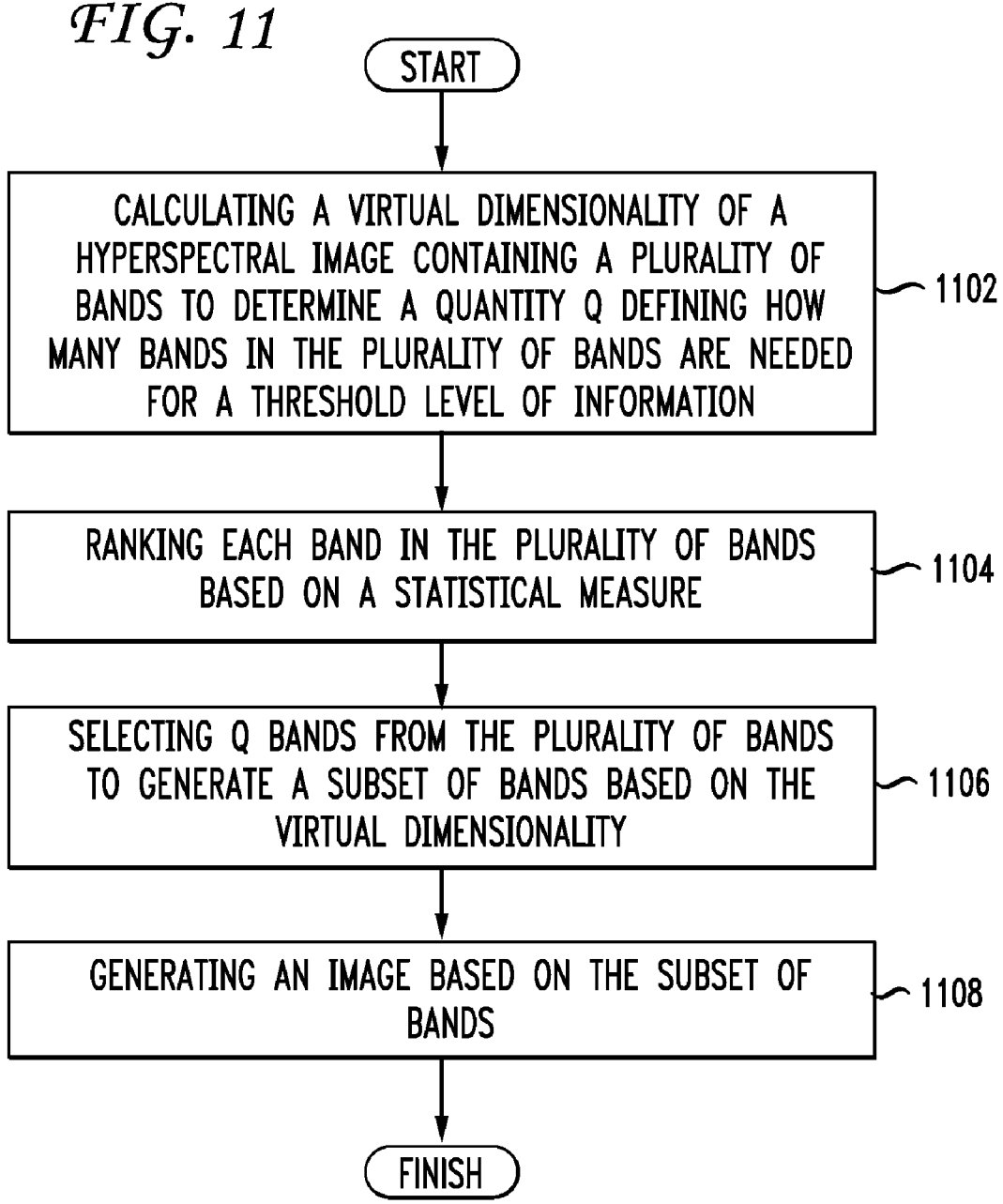

SYSTEM AND METHOD FOR PROGRESSIVE BAND SELECTION FOR HYPERSPECTRAL IMAGES

RELATED APPLICATIONS

This application claims priority to U.S. Provisional Application No. 61/226,889, filed 20 Jul. 2009, which is incorporated herein by reference in its entirety.

ORIGIN OF THE INVENTION

The invention described herein was made by an employee of the United States Government and may be manufactured and used by or for the Government for governmental purposes without the payment of any royalties thereon or therefore.

BACKGROUND

1. Technical Field

The present disclosure relates to image processing, and more specifically, to generating reduced dataset images from hyperspectral images.

2. Introduction

A standard photograph or image is generated from the visible spectrum of light. A hyperspectral image is generated from a wider electromagnetic spectrum. For example, a hyperspectral image can include visible light as well as ultraviolet, infrared, or other forms of electromagnetic radiation. Thus, a hyperspectral image includes far more data than a standard image.

Space-borne hyperspectral imagers collect enough information to identify materials and substances on the ground. Scientists often use hyperspectral data to investigate land use, mineral deposits, or signs of climate change. However, the same data is also useful during disasters or other emergencies, when detection and mapping of fires, chemical agents, or flooded areas can provide critical information to first-responders, each of which relies on the ability to identify materials quickly and accurately.

Typically only a small portion of a hyperspectral image is useful to identify any given material. The sheer volume of data in hyperspectral images causes many material classification programs to run slowly and produce poor results, as they search the full image dataset for the information they need. Time-sensitive applications as well as applications which are not time-sensitive would benefit greatly from enhanced performance when analyzing hyperspectral images.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and non-transitory computer-readable storage media for progressive band selection for hyperspectral images. A system configured to practice the method calculates a virtual dimensionality of a hyperspectral image having multiple bands to determine a number Q indicating how many bands are needed for a threshold level of information, ranks each band based on a statistical measure, selects Q bands from the multiple bands to generate a subset of bands based on the virtual dimensionality, and generates a reduced subset image based on the subset of bands. The system can include one or more hardware and/or software modules configured to control a processor to practice these various steps. This approach can create reduced datasets of full hyperspectral images tailored for individual applications. The system uses a metric specific to a target application to rank the image bands, and then selects the most useful bands. The number of bands selected can be specified manually or calculated from the hyperspectral image's virtual dimensionality.

In one aspect, the statistical measure is entropy defined as $$H(x) = \sum_{i=1}^{N} p(x_i)\log_2 p(x_i),$$

where p(x) is a probability of pixel x within the hyperspectral image calculated by constructing a histogram of image pixels, and N is a number of pixels in the hyperspectral image. In another aspect, the statistical measure is information divergence defined as $$D(p;g) = \sum_{i=1}^{N} p_i \log(p_i/g_i) + \sum_{i=1}^{N} g_i \log(g_i/p_i),$$

where p is an image band in the hyperspectral image, and g is a dataset with a Gaussian distribution with a same mean and variance as the image band p.

Q can be determined by progressive band selection based on an application-specific performance target. The performance target can be a tradeoff between accuracy and processing speed. In one variation only highest-ranked bands are selected. Progressive band selection can be performed via progressive band expansion, progressive band reduction, and/or binary bisection band selection.

This approach can tailor datasets for specific applications and can be adapted to run onboard an observing spacecraft. This means the spacecraft can make decisions in-flight based on the data it collects without transmitting the full image to the ground and/or waiting for instructions from human controllers.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 11 illustrates an exemplary method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for more efficient hyperspectral imaging. A brief introductory description of a basic general purpose system or computing device in FIG. 1 which can be employed to practice the concepts is disclosed herein, followed by a brief discussion of the electromagnetic spectrum. A more detailed description of the approaches set forth herein will then follow.

Hyperspectral images contain far more information than is necessary for most applications. Trying to make use of some or all of the data in an image can yield less accurate results than if some information were intentionally thrown away. Discarding the appropriate information provides at two benefits: reduced processing time and improved quality of the output image. Additionally, hyperspectral imagers installed on spacecraft with slow downlink transmitters can save bandwidth and transmission time by removing information before sending the image to the ground.

In this approach, the system must carefully select which information to discard. Often the information needed for a particular application lies in a few critical bands. Some example applications include a land classification task of distinguishing between two types of vegetation or a target detection task of detecting a camouflaged tank. Once the system identifies these bands, the system can often discard the rest of the information safely.

Progressive band selection (PBS) can detect the most critical image bands for a target application and build reduced images with only as many bands as are needed. The first step requires a criterion on which to judge the image bands and assign a numerical score. While PBS can use any real-valued function to generate these priority scores, most of the criteria calculate a statistic (such as variance) for some, most, or all pixels in the band.

After assigning scores to each band, PBS builds a reduced image containing only the highest-scoring bands. A user can either directly specify the number of bands to keep, or specify an acceptable level of application performance. In the latter case, PBS uses at least one of a number of methods to search for the proper number of bands to retain. These variations shall be discussed herein as the various embodiments are set forth. The disclosure also discusses the criteria used to identify the most valuable bands in an image, how PBS finds the correct number of bands to include in its output, and an experiment testing band selection and output image sizing methodologies in a land classification application. The disclosure now turns to FIG. 1.

Figure 1:
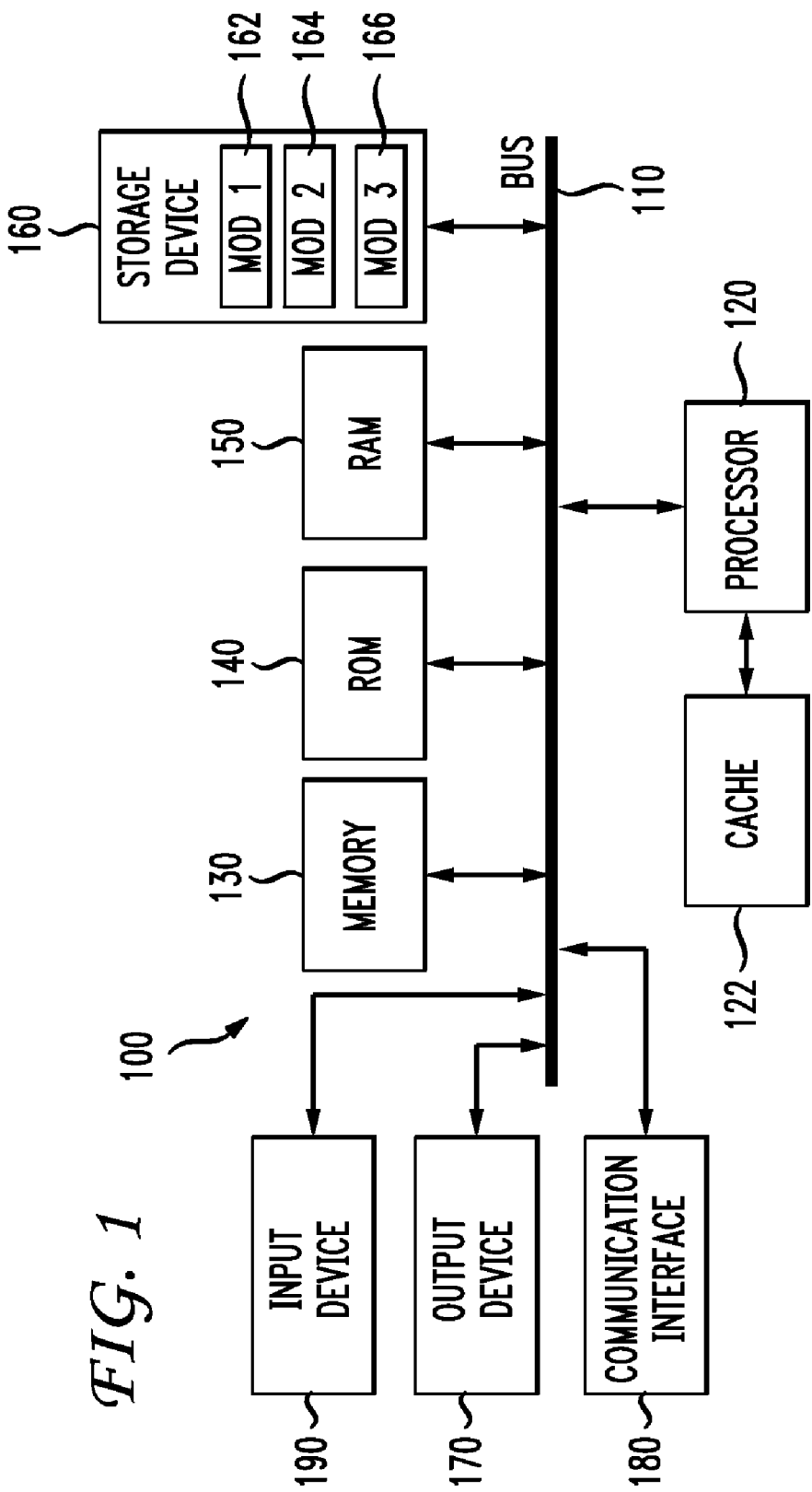
FIG. 1 illustrates an exemplary system embodiment.

With reference to FIG. 1, an exemplary system 100 includes a general-purpose computing device 100, including a processing unit (CPU or processor) 120 and a system bus 110 that couples various system components, including the system memory 130, such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 can essentially be a completely self-contained computing system, containing multiple cores or processors, a bus, memory controller, cache, etc. A multi-core processor can be symmetric or asymmetric.

The system bus 110 can be any of several types of bus structures including a memory bus or memory controller, a peripheral bus, and a local bus using any of a variety of bus architectures. A basic input/output (BIOS) stored in ROM 140 or the like, can provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, can also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here can be substituted for improved hardware or firmware arrangements as they are developed.

For clarity of explanation, the illustrative system embodiment is presented as including individual functional blocks including functional blocks labeled as a "processor" or processor 120. The functions these blocks represent can be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 can be provided by a single shared processor or multiple processors. (Use of the term "processor" should not be construed to refer exclusively to hardware capable of executing software.) Illustrative embodiments can include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, can also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules can be stored on the storage device 160 and loaded into RAM 150 or memory 130 at runtime or can be stored as would be known in the art in other computer-readable memory locations.

Figure 2:
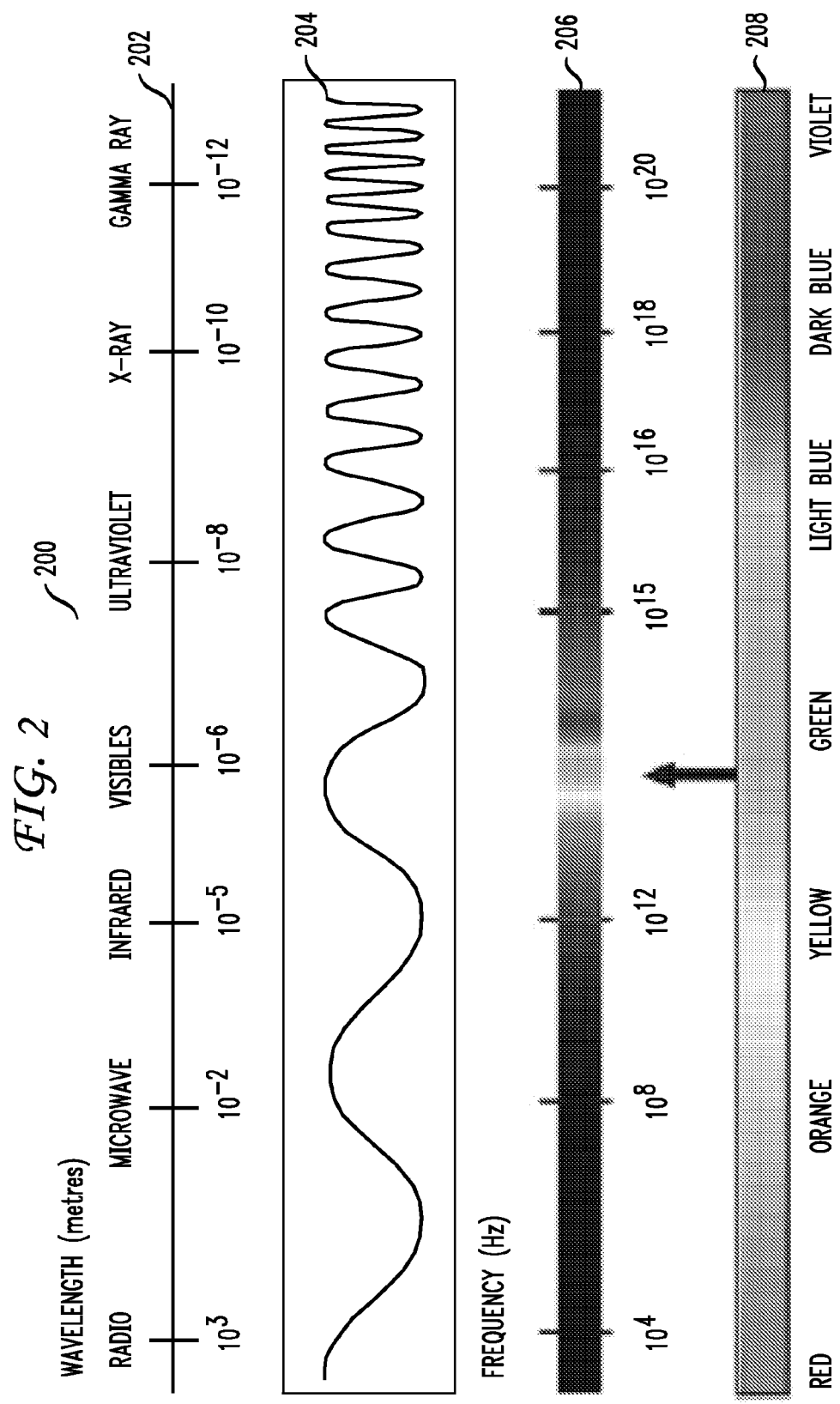
FIG. 2 illustrates a graphical representation of the electromagnetic spectrum.

Having discussed some basic system components, the disclosure now turns to a discussion of the electromagnetic spectrum, all or part of which can be represented as part of a hyperspectral image. FIG. 2 illustrates a graphical representation 200 of the electromagnetic spectrum. The electromagnetic spectrum represents a wide range of wavelengths of electromagnetic radiation, including radio waves, microwaves, infrared light, visible light, ultraviolet light, x-rays, and gamma rays 202. The frequencies 204, 206 of the different types of electromagnetic radiation vary along the spectrum from low to high. The curved line 204 is a graphical depiction (not to scale) to illustrate the different frequencies 206 on the line chart. In the range of frequencies 206, the bottom chart 208 shows an expanded view of the spectrum of visible light including red, orange, yellow, green, light blue, dark blue, violet, and many other colors. A typical image, such as an image obtained through a telescope or a digital camera, represents electromagnetic radiation in the visible spectrum, otherwise known as light. A hyperspectral image can encompass electromagnetic radiation from below and above visible light as well as all or part of the visible light spectrum.

In one aspect, a hyperspectral image is a collection of images each representing a band, or range of spectrum. The collection of images can be a collection of layers which can be added or removed to create a combined image. In one variation, the bands of each layer in the image represent narrow spectral bands over a contiguous spectral range. For example; a hyperspectral image covering a total of 100 nanometers of spectrum can include five contiguous 20-nanometer bands. In another variation, the bands are less narrow and can be non-contiguous, with a spectral gap between bands. For example, a hyperspectral image covering a total of 200 nanometers of spectrum can include 10 evenly-spaced contiguous 15-nanometer bands with a 5 nanometer gap between bands. Other sizes of gaps and bands can be used, including irregularly sized bands and gaps.

The disclosure now turns to a discussion of band selection criteria. Multiple criteria can be used to rank image bands. In one implementation, eight criteria are used: three criteria compute central moments about the data, two criteria calculate more complex statistical measures, and three criteria are used as experimental controls.

Central moment criteria treat the image band as a set of samples $x_i$ from a random variable X, then compute the central moments of the image band. Although a data set with high variance is not guaranteed to be more useful than one with low variance, greater variance is one measure that implies greater information content. Likewise, larger measures of other central moments generally indicate that the image has features useful to the target application. Below are several exemplary formulas for calculating variance as a second central moment, skewness as a third central moment, and kurtosis as a fourth central moment. Skewness is a degree of asymmetry in a distribution, such as extreme deviations in the distribution. Kurtosis generally refers to the degree to which scores are concentrated in the center of a distribution. For example, a higher kurtosis can correspond to less frequent extreme deviations in the distribution.

Variance can be expressed by the following equation:

$$\sigma^2 = \frac{1}{N-1} \sum_{i=1}^{N} (x_i - \bar{x})^2 \quad (1)$$

where $x_i$ is the value of pixel i, $\bar{x}$ is the mean value of all or part of the pixels in the band, and N is the number of pixels.

Skewness can be expressed by the following equation:

$$\text{skewness} = \frac{1}{N-1} \sum_{i=1}^{N} \frac{(x_i - \bar{x})^3}{\sigma^3} \quad (2)$$

where σ is the standard deviation of all or part of the pixels in the band. Skewness measures how asymmetric a probability distribution is.

Kurtosis, which is a measure of 'peakedness' of a probability distribution, can be expressed by the following equation:

$$\text{kurtosis} = \frac{1}{N-1} \sum_{i=1}^{N} \frac{(x_i - \bar{x})^4}{\sigma^4} \quad (3)$$

Two exemplary criteria which can be used to calculate more complex statistical measures include entropy and information divergence. These infinite-order statistics can further be used to measure information content in a data set. Entropy is one classic example, expressed by the following equation:

$$H(x) = -\sum_{i=1}^{N} p(x_i) \log_2 p(x_i) \quad (4)$$

where p(x) is the probability of pixel x within the image X (calculated by constructing a histogram of image pixels) and N is the number of pixels in the image. This equation calculates H(x) in bits per pixel.

Information divergence is one alternative measure of information content. Information divergence calculates the number of additional bits needed to represent a dataset with one distribution using a code designed for another distribution. The former (denoted p in Equation (5) below) is the image band, and the latter (g) is a dataset with a Gaussian distribution with the same mean and variance as the image. The more the distribution of data in the image deviates from the Gaussian model, the higher its information divergence (D), and the more information it is presumed to contain. Information divergence is expressed by the following equation:

$$D(p; g) = \sum_{i=1}^{N} p_i \log(p_i / g_i) + \sum_{i=1}^{N} g_i \log(g_i / p_i) \quad (5)$$

The remaining three exemplary criteria, random, uniform, and sensor-based, can be used as experimental controls. These are naïve alternatives to computing statistical measures for each band. The random classifier assigns a random score between 0 and 1 to each image band. The uniform classifier scores bands in a way that ensures the selected bands are distributed evenly across the original frequency range. For example, if the system intends to select 100 of 200 bands from an image, the uniform classifier assigns a high score (between 2 and 3) to odd-numbered bands and a low score (between 0 and 1) to even-numbered bands. The image output by PBS will therefore contain every other band across the original range. The sensor-based classifier uses basic information about the image sensor to improve the output of the random classifier. This classifier assigns a zero score to bands known to be uncalibrated, masked, or of otherwise low quality, then gives random scores to the remaining bands. This optimization adds very little complexity to the random selection algorithm.

Figure 3:
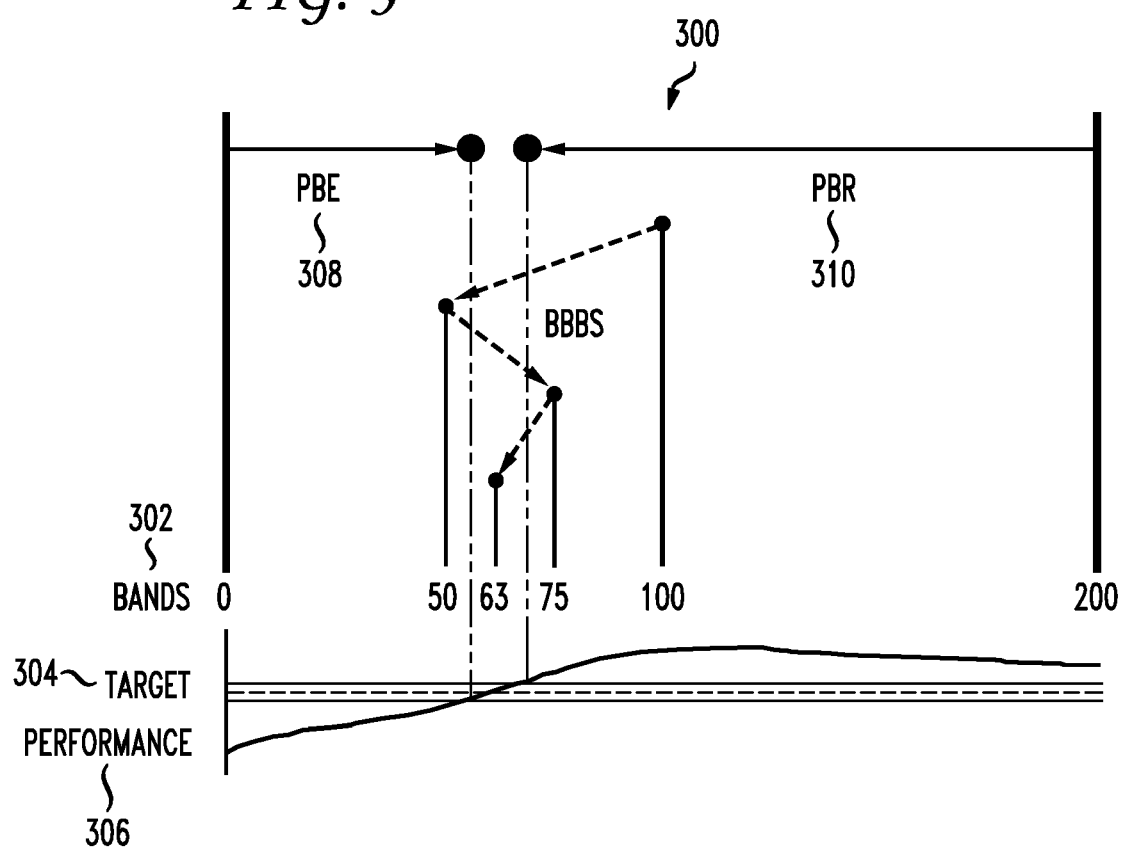
FIG. 3 illustrates three approaches for progressive band selection.

The disclosure now turns to a more detailed discussion of progressive band selection. Progressive band selection can tailor the number of bands in the reduced image for a particular target application. For example, if a target application is to detect a thin layer of salt on the surface of the ground, progressive band selection can select the number of bands and band frequencies that clearly demonstrate presence or absence of salt. Other example target applications can include detecting different types of crops, minerals, or any of a wide variety of objects on the surface of the ground, as well as underwater, or under some other at least partially transparent material. If a human operator does not directly specify the number of bands, PBS can search for the right number of bands to retain to meet an application-specific performance target. FIG. 3 is a chart 300 illustrating approaches of three search strategies, progressive band expansion (PBE) 308, progressive band reduction (PBR) 310, and binary bisection band selection (BBBS) 312, which will each be discussed in turn. In the chart 300 of FIG. 3, the number of bands 302 ranges from 0 to 200, the target region 304 represents a target performance level suitable for the particular application, and the performance line 306 represents actual or estimated system performance based on the progressive band selection.

Starting with an empty output image, a system operating according to PBE 308 adds the highest-ranking image band to the output image and measures its performance 306 in the target application 304. If higher performance is needed, the system adds the next highest-ranking band and measures the performance again. The system continues this process until the application meets its performance target 304 using the output image.

PBR is the logical inverse of PBE. A system operating according to PBR 310 starts with a copy of the input image as its output. The system removes the lowest-ranking band and measures application performance 306. The system repeats this process until enough bands have been removed to reduce application performance 306 to match or fall just below the target level 304.

PBR and PBE are both iterative, linear search approaches to identify the right number of bands to retain. By contrast, binary bisection band selection (BBBS) 312 performs a binary search, which is a logarithmic approach. PBR and PBE perform searches in O(N) time, while BBBS performs searches in O(log N) time. BBBS 312 begins with an output image containing the highest-ranking 50% of bands from the input image, representing the midpoint between an empty image and the full dataset. If application performance is above the target performance threshold 304, the system removes the lowest-ranking half of these bands, leaving the highest ranking 25%. However, if performance was inadequate, the system adds half of the bands that were excluded from the first dataset, such that the output image consists of the highest-ranking 75% of input bands. The system measures performance again. If necessary, the system adjusts the number of bands by a factor of ⅛ or 12.5%. The process continues until performance is within an acceptable range.

Figure 4:
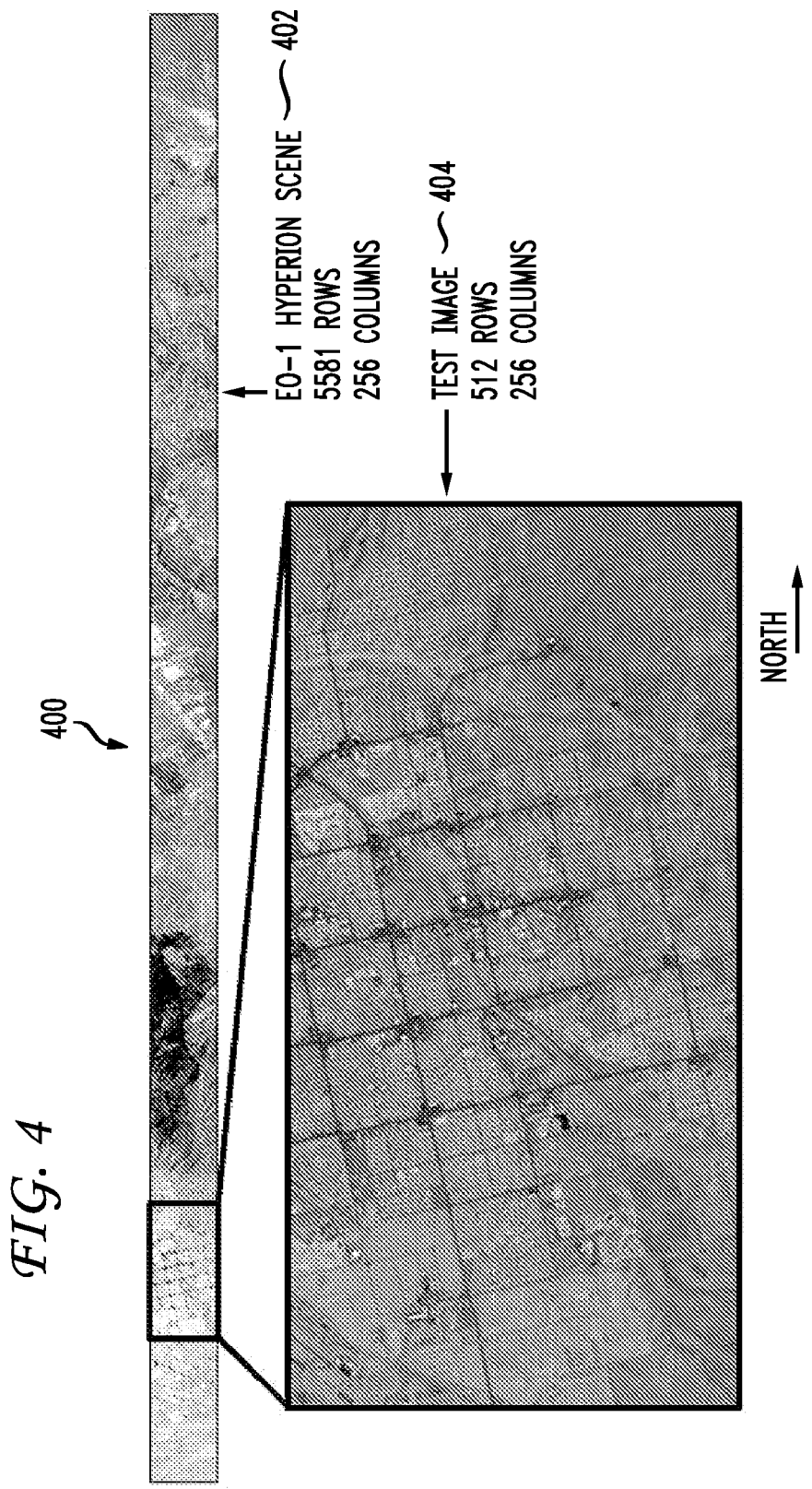
FIG. 4 illustrates an exemplary test image from a space-born imaging device.

In order to demonstrate these principles, the disclosure turns to some experimental data. The experimental data 400 are based on a test image 404, shown in FIG. 4, which is a small subset of a larger image 402 taken by the Hyperion instrument onboard the NASA EO-1 spacecraft. The test image 404 depicts a suburban and mountainous forest area near Tucson, Ariz. on 17 Jun. 2003 at 10:00-10:15 a.m. local time. The original larger image 402 is 5581 pixels long. The test image 404 is a 512 pixel subset of the larger image 402, centered over the suburban area. Both images have 256 spatial columns, and each pixel covers an area of 30 square meters. The original image 402 includes 242 spectral bands, covering wavelengths between 400 and 2500 nm. Atmospheric correction of the image is not necessary because the training data needed for both classification algorithms are taken from the image itself. The same atmospheric effects affect training and test pixels.

Figure 5:
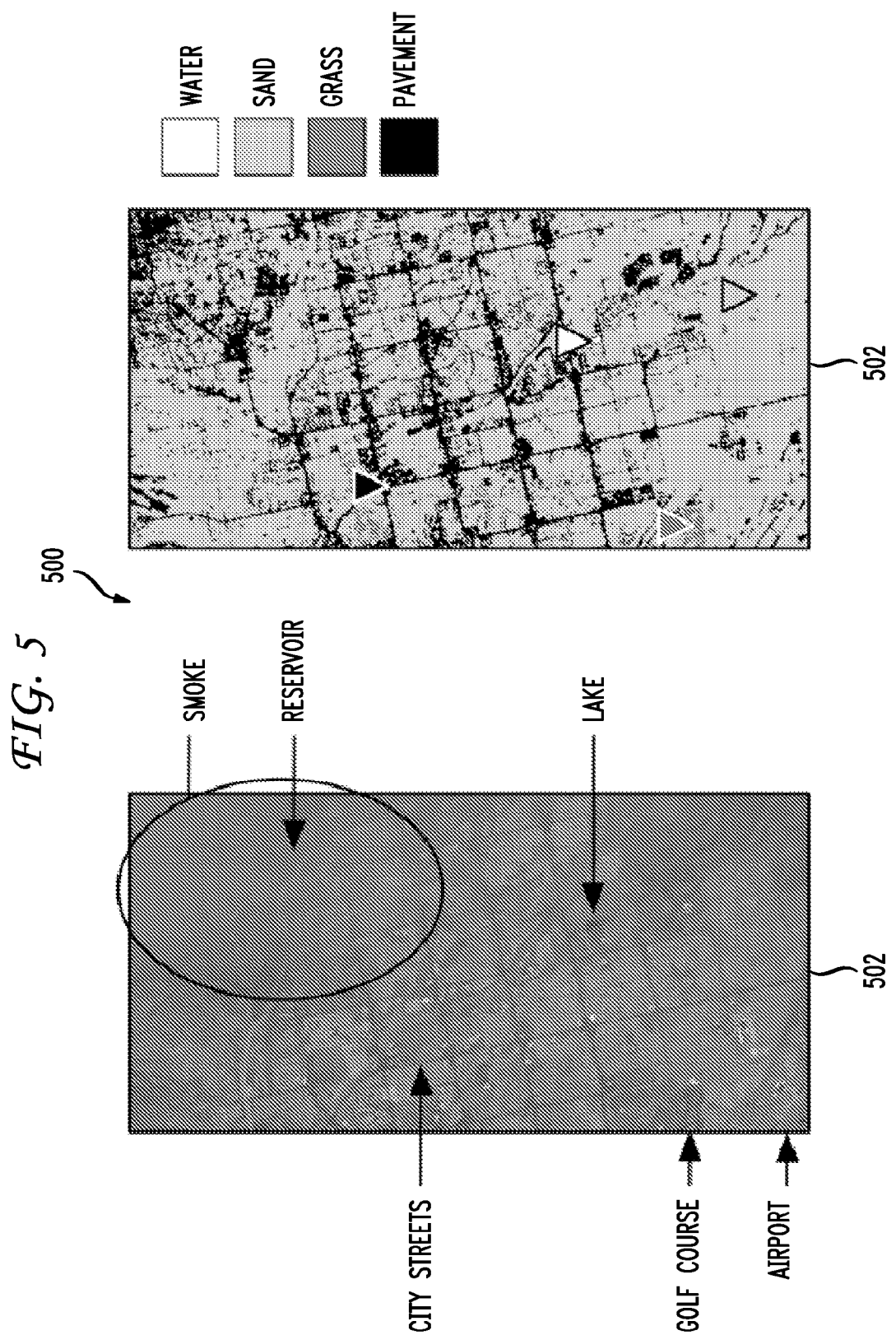
FIG. 5 illustrates some major features in the exemplary test image.

FIG. 5 is a representation 500 of a first image 502 showing the major features in the test image 404 and a second image 504 showing a map of material present in the test image 404. A suburb covers the center of the image which shows a grid of paved streets encircling residential areas, shopping malls, and parking lots. The residential areas consist of grassy lawns along narrow side streets. The largest expanse of paved ground is the runway at the airport, south of the suburbs, and the largest expanses of grass are found at the golf course just to its north.

A forest fire rages in the mountains to the north, and while the fire itself is not included in the test image, the upper-right corner is shrouded by smoke from the blaze. The only detectable pools of water in this parched suburb are a lake and a small reservoir.

Typically, PBS uses one of the three methods described above to determine an acceptable number of bands to include in the output image. However, one aim of the experimental data is to test Virtual Dimensionality (VD) as an initial estimate of the output band count. VD is a measure of the number of spectrally distinct signals that combine to produce the spectra in the output image. PBS prepares output images with band counts equal to several multiples of VD (0.25, 0.5, 1, 1.5, 2, 2.5). In this example, the VD of the test image is 35, so PBS is configured to prepare reduced image output with 9, 18, 35, 53, 70, and 88 bands images using each of the eight criteria. The reduced images are fed as input to two land classification algorithms.

Figure 6:
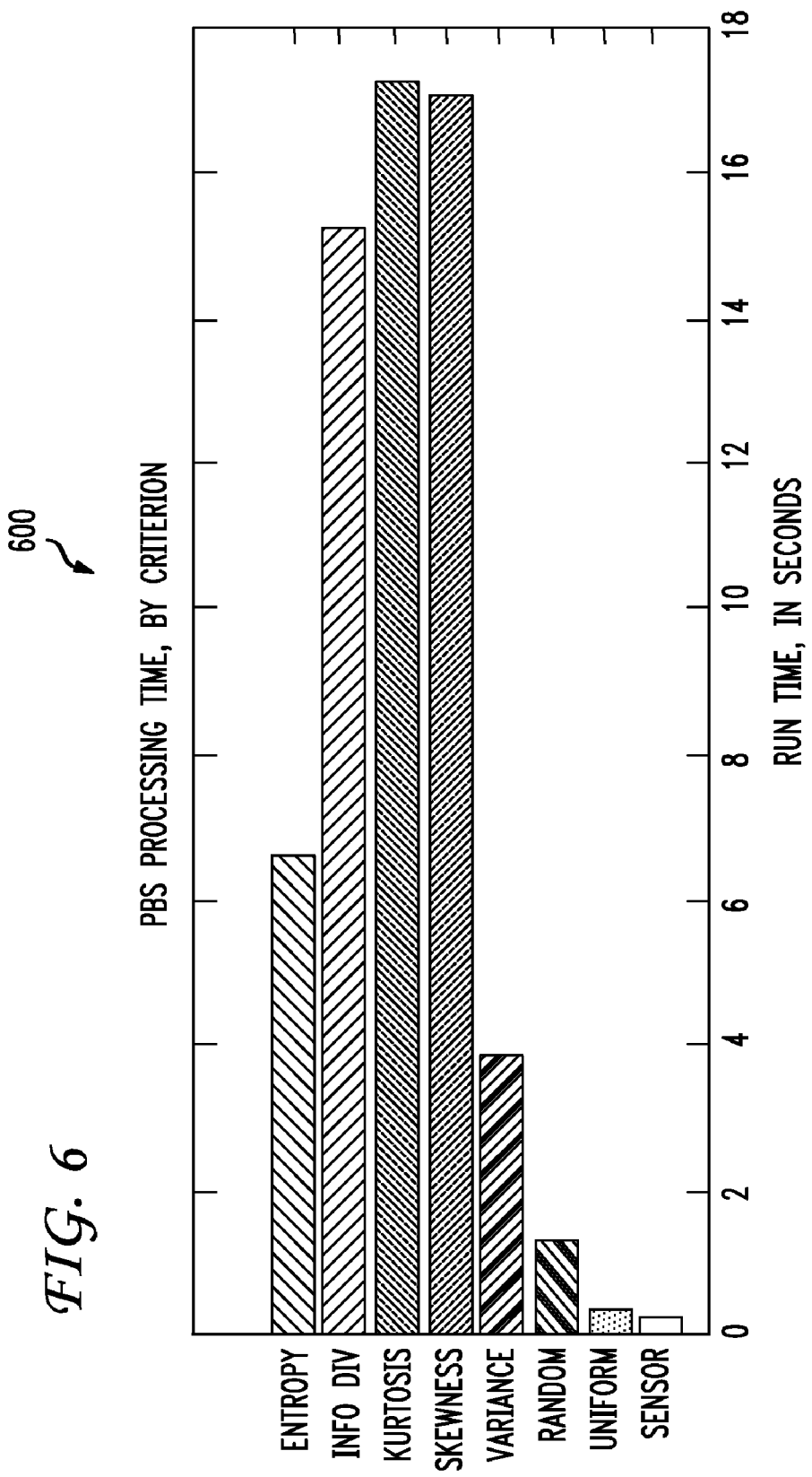
FIG. 6 illustrates a chart of time needed to process the exemplary test image based on the criterion used.

PBS requires a certain amount of processing time. Ideally, the time saved, by processing the reduced image in place of the full-size image offsets the cost of using PBS. FIG. 6 is a chart 600 that shows how the time needed to process the test image with PBS varies with the criterion used. The skewness and kurtosis criteria are the most computationally expensive, followed closely by information divergence. Skewness, kurtosis, and information divergence use expensive mathematical operations to generate priority scores, and extensive processing that may not be worth the effort.

Spectral angle mapping (SAM) computes the similarity of two image pixels by treating them as vectors in a high-dimensional space and measuring the angle between the vectors. This technique is useful for satellite images because it ignores differences in the intensity of sunlight in each pixel and focuses instead on the differences in the at-sensor spectral radiance of the two materials. SAM makes material classification maps by comparing each pixel to a set of representative material spectra and coloring the map according to which material spectra makes the smallest angle with each pixel.

The four dominant materials present in the test image 404 are grass, pavement, soil and water. The triangles in FIG. 5 show where pixels representing these materials were selected from the original image 402. FIG. 5 also shows a material map 504 created using the full test image. In this experiment, the system processes the PBS output images with SAM to attempt to generate the same or similar map.

Figure 9:
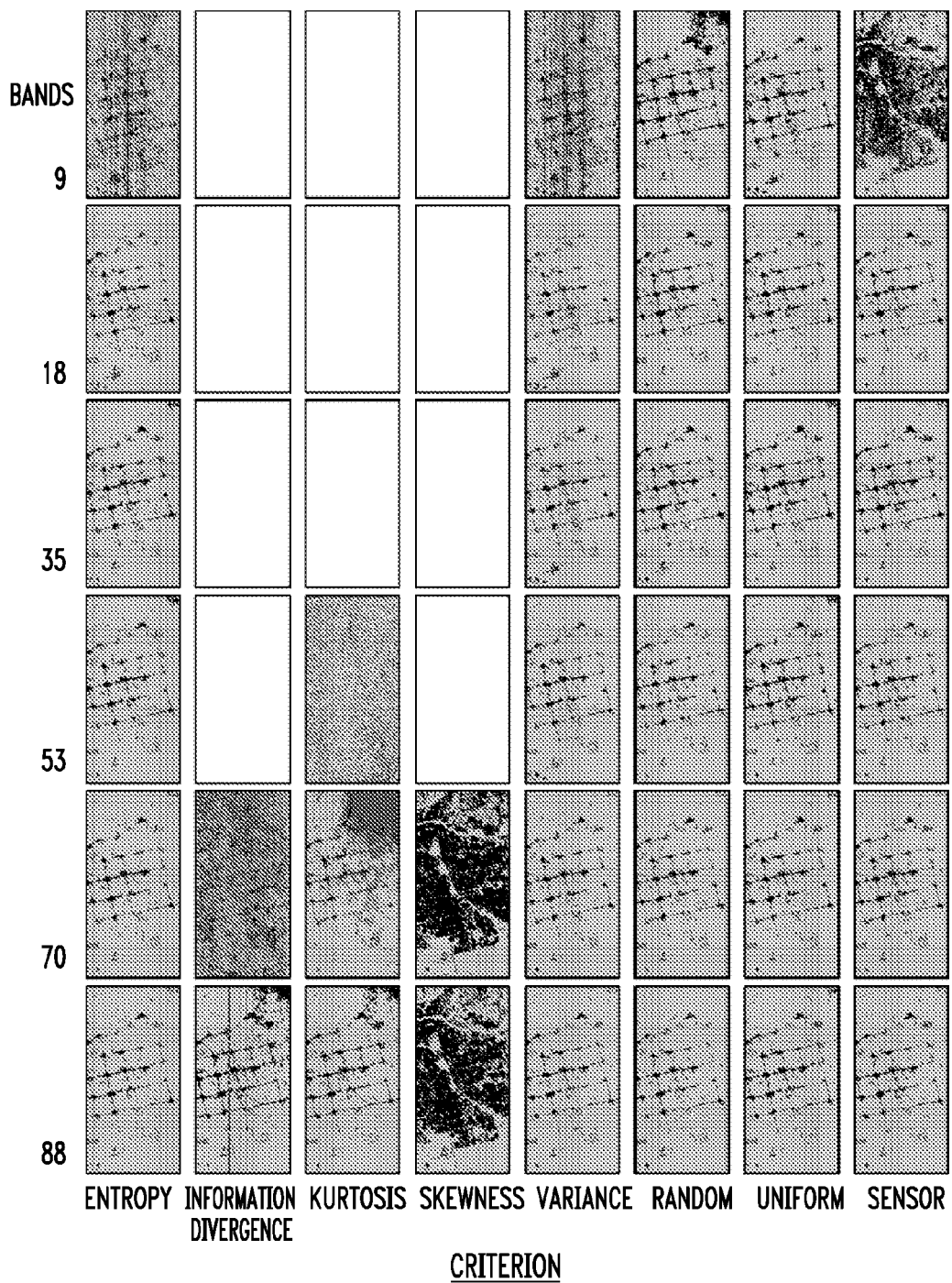
FIG. 9 illustrates exemplary output of a spectral angle mapping classifier based on a subset of image bands.

FIG. 9 shows the maps generated by SAM from each of the reduced images. The information divergence, kurtosis and skewness criteria failed to make reduced images with fewer than 53 bands that SAM could process. Again, kurtosis measures the peakedness of a data distribution or essentially measures a bell curve, and skewness measures the degree to which a distribution is not in balance with a mean. These maps are left blank. This is because the criteria selected mostly dark and uncalibrated bands, due to the fact that these bands have data that are heavily skewed from the expected Gaussian distribution. These criteria consider the heavily skewed bands valuable, when, in fact, they are just noisy. Larger datasets produced by these criteria (which are guaranteed to contain at least some calibrated bands) still produced poor material maps. Kurtosis caused misclassification of the smoky area in the upper-right corner, and skewness caused most of the central area to be classified as pavement. Other criteria fared better. With as few as 18 bands (one half of the image's virtual dimensionality), entropy, variance, and the three control criteria (random, uniform and sensor-based) produced images that yielded nearly correct SAM output. The five criteria appeared to perform almost equally, indicating that 18 bands (½×VD) is enough to perform the classification and still allow for slight variance in the set of bands chosen. When the system uses only nine bands (¼×VD), however, only the uniform classifier produced reliable output.

Figure 7:
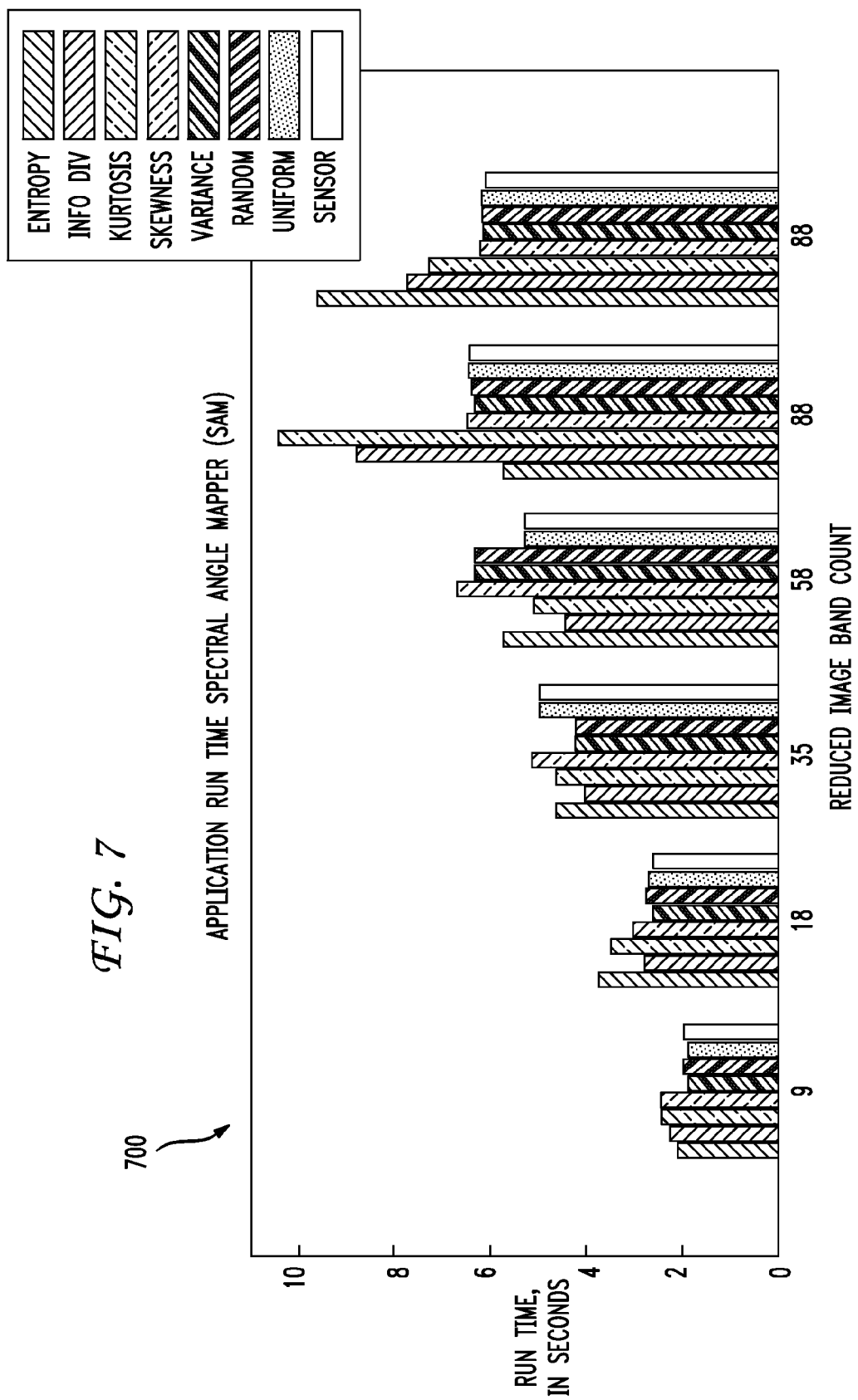
FIG. 7 illustrates a chart of time needed to process the exemplary test image using spectral angle mapping based on a subset of image bands.

Smaller images can be processed faster than larger ones, but FIG. 7 is a chart 700 showing that processing an 18-band version of the test image 404 saves only three seconds over processing an 88-band version. Since the five non-control criteria take more than three seconds to execute, PBS preprocessing is not economical for this data set.

Another type of classifier is a support vector machine (SVM)-based classifier. An SVM classifier can use C-support vector classification (C-SVC), the radial basis function (RBF) kernel, and the one-against-one approach to multi-class classification. Using a gamma value of 2 yields the most accurate output in this configuration. The SVM classifier was tested using 48 pixels from the test image 404, twelve for each material. The pixels were gathered from the regions marked with triangles in FIG. 5. Training the SVM took an insignificant amount of time.

Figure 10:
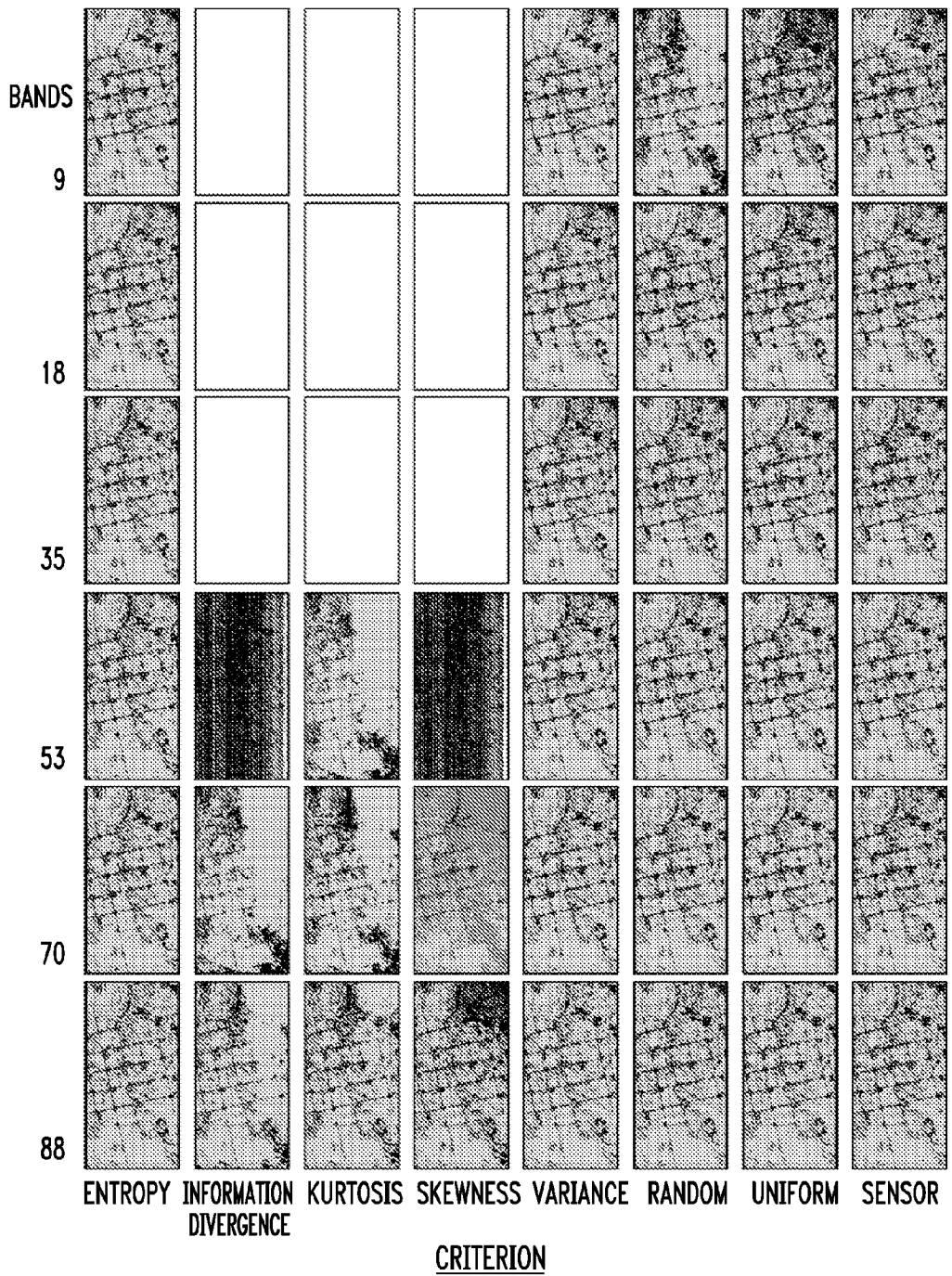
FIG. 10 illustrates exemplary output of a support vector machine-based classifier based on a subset of image bands.

SVM output maps, shown in FIG. 10, have a much different appearance from their SAM counterparts in FIG. 9. SAM tends to find a "default" material choice, meaning that the system tends to classify all pixels as this material (sand, in the case of the test image) unless their spectra are very similar to one of the other materials. In SVM output maps, more pixels are classified as pavement or grass, even when they contain a substantial proportion of sand. As noted previously, the information divergence, skewness, and kurtosis criteria failed to provide reduced images with fewer than 53 bands that could be processed by SVM. Even when allowed to select 70 or 88 bands, these three criteria produced images that made it easy for SVM to misclassify pixels in areas obscured by smoke.

Results for other criteria also mirrored the results obtained using SAM. Entropy, variance, and the control criteria each produced images with as few as 18 bands (½*VD) that yielded output maps that were virtually identical to those made with reduced images with 88 bands or the full image. However given only nine bands, SVM appears to outperform SAM. Maps produced with the variance and sensor-based criteria are remarkably similar to those made with the full-size image. The performance of the other criteria given so few bands indicates that this output is unreliable.

Figure 8:
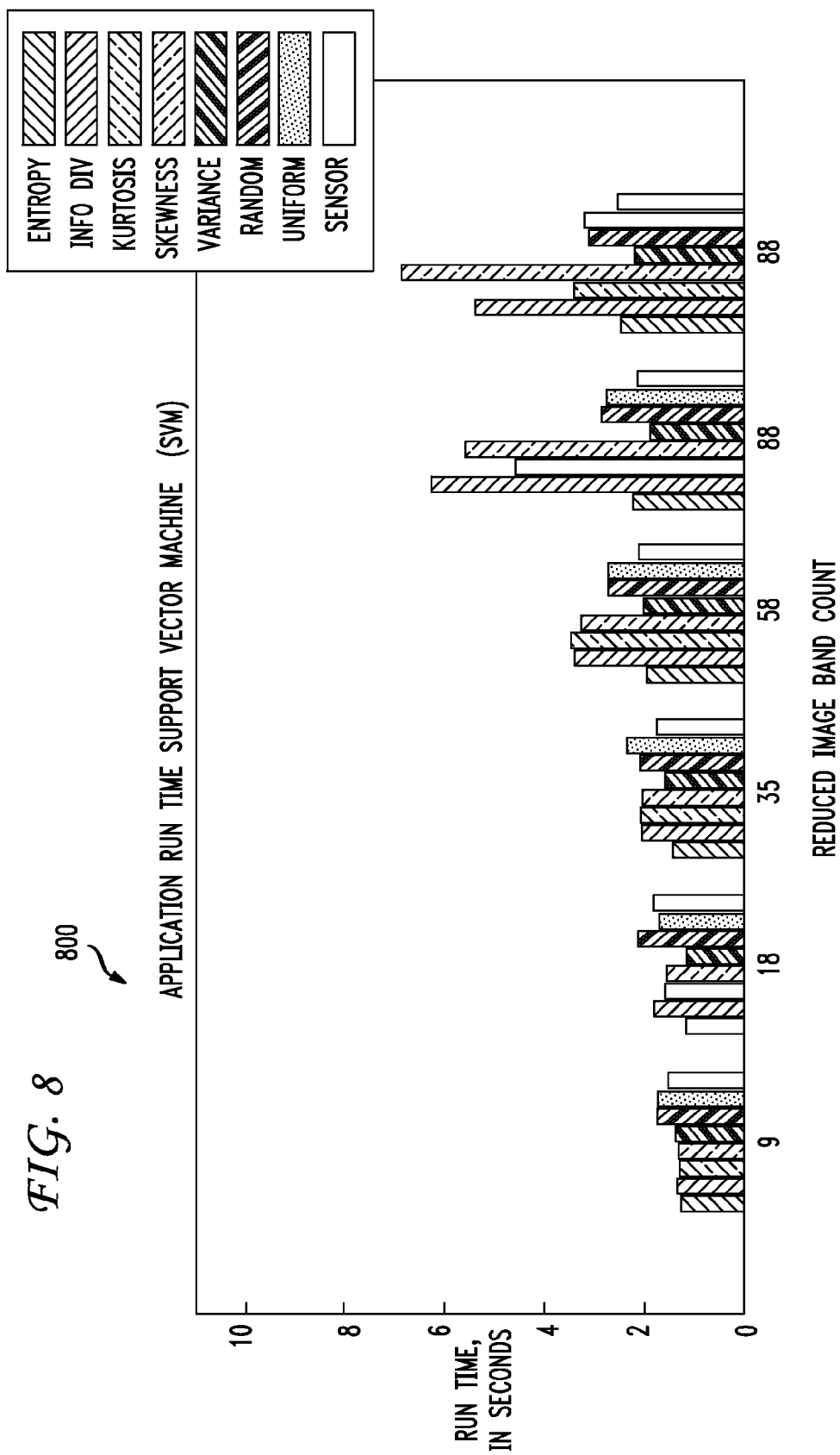
FIG. 8 illustrates a chart of time needed to process the exemplary test image using a support vector machine-based classifier based on a subset of image bands.

The chart 800 in FIG. 8 shows that SVM is a more efficient algorithm than SAM, making similar maps in roughly half the time. However, as with SAM the time saved is far less than the time PBS spends to process the images.

PBS can reduce processing time by removing spectral redundancy from hyperspectral images. In land classification scenarios in particular, the system processes smaller datasets in less time than the full image yet produce similar output. However, the savings in the experimental dataset do not offset the overhead of running PBS with any of the five non-control criteria. It is worth pointing out that the control criteria, meant to represent naïve methods of band selection, produce reduced images with equal or greater quality than the non-control criteria, and run quickly enough to make PBS an economical way of improving processing efficiency.

Having disclosed some basic system components, algorithms, and experimental data, the disclosure now turns to the exemplary method embodiment for progressive band selection for hyperspectral images, as shown in FIG. 11. For the sake of clarity, the method is discussed in terms of an exemplary system 100, as shown in FIG. 1, configured to practice the method or having first, second, third modules and so forth configured to control a processor to practice the various steps of the method. The system calculates a virtual dimensionality of a hyperspectral image containing a group of bands to determine a quantity Q defining how many bands in the group of bands are needed for a threshold level of information (1102). The system 100 can determine Q by progressive band selection based on an application-specific performance target. As set forth above, three exemplary progressive band selection algorithms are progressive band expansion, progressive band reduction, and binary bisection band selection.

The system 100 ranks each band in the group of bands based on a statistical measure (1104). The system 100 can rank each band further based on a central moment of each band, such as variance, skewness, and kurtosis.

The system 100 selects Q bands from the group of bands to generate a subset of bands based on the virtual dimensionality (1106) and generates an image based at least in part on the subset of bands (1108). When selecting Q bands from the group of bands, the system 100 can select highest-ranked bands from the group of bands. The system 100 can alternatively select other bands besides the highest-ranked bands. For example, in extremely low bandwidth or high latency situations, such as a space craft, where resources must be conserved aggressively, the system 100 can select the two most transmission-efficient bands from the highest-ranked bands, which can be bands #3 and #7 instead of bands #1 and #2. Other subsets of bands can be used as well, depending on the various requirements and tolerances of each particular application of these principles. For example, bands with lower entropy are more highly compressible and would be well suited to low-bandwidth applications. Thus, in one example the system 100 selects, from a set of highest ranked bands, the top N lowest entropy bands for transmission.

Embodiments within the scope of the present disclosure can also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure can be practiced in network computing environments with many types of computer system configurations, including personal computers, hand-held devices, multi-processor systems, microprocessor-based or programmable consumer electronics, network PCs, mini-computers, mainframe computers, and the like. Embodiments can also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein have military and surveillance applications, as well as applications in investigating land use, mineral deposits, and signs of climate change. Those skilled in the art will readily recognize various modifications and changes that may be made to the principles described herein without following the example embodiments and applications illustrated and described herein, and without departing from the spirit and scope of the disclosure.

I claim:

1. A method of progressive band selection for hyperspectral images, the method comprising:
    calculating a virtual dimensionality of a hyperspectral image containing a plurality of bands to determine a quantity Q defining how many bands in the plurality of bands are needed for a threshold level of information;
    ranking each band in the plurality of bands based on a statistical measure;
    selecting Q bands from the plurality of bands to generate a subset of bands based on the virtual dimensionality; and
    generating an image based on the subset of bands,
    wherein the statistical measure is entropy defined as $$H(x) = \sum_{i=1}^{N} p(x_i)\log_2 p(x_i),$$

where p(x) probability of pixel x within the hyperspectral image calculated by constructing a histogram of image pixels, and N is a number of pixels in the hyperspectral image.

2. The method of claim 1, wherein Q is determined by progressive band selection.

3. The method of claim 2, wherein progressive band selection is based on an application-specific performance target.

4. The method of claim 2, wherein progressive band selection comprises at least one of progressive band expansion, progressive band reduction, and binary bisection band selection.

5. The method of claim 1, wherein selecting Q bands from the plurality of bands further comprises selecting highest-ranked bands from the plurality of bands.

6. A method of progressive band selection for hyperspectral images, the method comprising:
 calculating a virtual dimensionality of a hyperspectral image containing a plurality of bands to determine a quantity Q defining how many bands in the plurality of bands are needed for a threshold level of information;
 ranking each band in the plurality of bands based on a statistical measure;
 selecting Q bands from the plurality of bands to generate a subset of bands based on the virtual dimensionality; and
 generating an image based on the subset of bands,
 wherein ranking each band is further based on a central moment of each band and wherein the central moment is calculated based on a skewness formula $$\text{skewness} = \frac{1}{N-1} \sum_{i=1}^{N} \frac{(x_i - \bar{x})^3}{\sigma^3},$$

where σ is standard deviation of all pixels in the respective band, $x_i$ is a value of pixel i, $\bar{x}$ is a mean value of all pixels in the respective band, and N is a number of pixels.

7. The method of claim 6, wherein Q is determined by progressive band selection and wherein selecting Q bands from the plurality of bands further comprises selecting highest-ranked bands from the plurality of bands.

8. The method of claim 7, wherein progressive band selection is based on an application-specific performance target.

9. The method of claim 7, wherein progressive band selection comprises at least one of progressive band expansion, progressive band reduction, and binary bisection band selection.

10. A method of progressive band selection for hyperspectral images, the method comprising:
 calculating a virtual dimensionality of a hyperspectral image containing a plurality of bands to determine a quantity Q defining how many bands in the plurality of bands are needed for a threshold level of information;
 ranking each band in the plurality of bands based on a statistical measure;
 selecting bands from the plurality of bands to generate a subset of bands based on the virtual dimensionality; and
 generating an image based on the subset of bands,
 wherein ranking each band is further based on a central moment of each band and wherein the central moment is calculated based on a kurtosis formula $$\text{kurtosis} = \frac{1}{N-1} \sum_{i=1}^{N} \frac{(x_i - \bar{x})^4}{\sigma^4},$$

where σ is a standard deviation of all pixels in the respective band, $x_i$ is a value of pixel i, $\bar{x}$ is a mean value of all pixels in the respective band, and N is a number of pixels.

11. The method of claim 10, wherein Q is determined by progressive band selection and wherein selecting Q bands from the plurality of bands further comprises selecting highest-ranked bands from the plurality of bands.

12. The method of claim 1, wherein progressive band selection is based on an application-specific performance target.

13. The method of claim 11, wherein progressive band selection comprises at least one of progressive band expansion, progressive band reduction, and binary bisection band selection.

14. A system for progressive band selection in hyperspectral images, the system comprising:
 a processor;
 a first module configured to control the processor to calculate a virtual dimensionality of a hyperspectral image containing a plurality of bands to determine a quantity Q defining how many bands in the plurality of bands are needed for a threshold level of information;
 a second module configured to control the processor to rank each band in the plurality of bands based on a statistical measure;
 a third module configured to control the processor to select Q bands from the plurality of bands to generate a subset of bands based on the virtual dimensionality; and
 a fourth module configured to control the processor to generate an image based on the subset of bands,
 wherein the statistical measure is information divergence defined as $$D(p; g) = \sum_{i=1}^{N} p_i \log(p_i / g_i) + \sum_{i=1}^{N} g_i \log(g_i / p_i),$$

where p is an image band in the hyperspectral image, and g is a dataset with a Gaussian distribution with a same mean and variance as the image band p.

15. The system of claim 14, wherein selecting Q bands from the plurality of bands further comprises selecting highest-ranked bands from the plurality of bands.

16. A method of progressive band selection for hyperspectral images, the method comprising:
 calculating a virtual dimensionality of a hyperspectral image containing a plurality of bands to determine a quantity Q defining how many bands in the plurality of bands are needed for a threshold level of information;
 ranking each band in the plurality of bands based on a statistical measure;
 selecting Q bands from the plurality of bands to generate a subset of bands based on the virtual dimensionality; and
 generating an image based on the subset of bands,
 wherein the statistical measure is information divergence defined as $$D(p; g) = \sum_{i=1}^{N} p_i \log(p_i / g_i) + \sum_{i=1}^{N} g_i \log(g_i / p_i),$$

where p is an image band in the hyperspectral image, and g is a dataset with a Gaussian distribution with a same mean and variance as the image band p.

17. The method of claim 16, wherein Q is determined by progressive band selection.

18. The method of claim 17, wherein progressive band selection is based on an application-specific performance target.

19. The method of claim 17, wherein progressive band selection comprises at least one of progressive band expansion, progressive band reduction, and binary bisection band selection.

20. The method of claim 16, wherein selecting Q bands from the plurality of bands further comprises selecting highest-ranked bands from the plurality of bands.

21. A method of progressive band selection for hyperspectral images, the method comprising:
calculating a virtual dimensionality of a hyperspectral image containing a plurality of bands to determine a quantity Q defining how many bands in the plurality of bands are needed for a threshold level of information;
ranking each band in the plurality of bands based on a statistical measure;
selecting Q bands from the plurality of bands to generate a subset of bands based on the virtual dimensionality; and
generating an image based on the subset of bands,
wherein ranking each band is further based on a central moment of each band, and wherein the central moment is calculated based on a variance formula $$\sigma^2 = \frac{1}{N-1} \sum_{i=1}^{N} (x_i - \bar{x})^2,$$

where $x_i$ is a value of pixel i, $\bar{x}$ is a mean value of all the respective band, and N is a number of pixels.

22. The method of claim 21, wherein Q is determined by progressive band selection and wherein selecting Q bands from the plurality of bands further comprises selecting highest-ranked bands from the plurality of bands.

23. The method of claim 22, wherein progressive band selection is based on an application-specific performance target.

24. The method of claim 22, wherein progressive band selection comprises at least one of progressive band expansion, progressive band reduction, and binary bisection band selection.

25. A system for progressive band selection in hyperspectral images, the system comprising:
a processor;
a first module configured to control the processor to calculate a virtual dimensionality of a hyperspectral image containing a plurality of bands to determine a quantity Q defining how many bands in the plurality of bands are needed for a threshold level of information;
a second module configured to control the processor to rank each band in the plurality of bands based on a statistical measure;
a third module configured to control the processor to select Q bands from the plurality of bands to generate a subset of bands based on the virtual dimensionality; and
a fourth module configured to control the processor to generate an image based on the subset of bands,
wherein the statistical measure is entropy defined as $$H(x) = \sum_{i=1}^{N} p(x_i) \log_2 p(x_i),$$

where p(x) is a probability of pixel x within the hyperspectral image calculated by constructing a histogram of image pixels, and N is a number of pixels in the hyperspectral image.

26. The system of claim 25, wherein selecting Q bands from the plurality of bands further comprises selecting highest-ranked bands from the plurality of bands.

27. A non-transitory computer-readable storage medium storing instructions which, when executed by a computing device, cause the computing device to perform progressive band selection for hyperspectral images, the instructions comprising:
calculating a virtual dimensionality of a hyperspectral image containing a plurality of bands to determine a quantity Q defining how many bands in the plurality of bands are needed for a threshold level of information;
ranking each band in the plurality of bands based on a statistical measure;
selecting Q bands from the plurality of bands to generate a subset of bands based on the virtual dimensionality; and
generating an image based on the subset of bands,
wherein the statistical measure is entropy defined as $$H(x) = \sum_{i=1}^{N} p(x_i) \log_2 p(x_i),$$

where p(x) is a probability of pixel x within the hyperspectral image calculated by constructing a histogram of image pixels, and N is a number of pixels in the hyperspectral image.

28. The non-transitory computer-readable storage medium of claim 27, wherein Q is determined by progressive band selection.

29. A non-transitory computer-readable storage medium storing instructions which, when executed by a computing device, cause the computing device to perform progressive band selection for hyperspectral images, the instructions comprising:
calculating a virtual dimensionality of a hyperspectral image containing a plurality of bands to determine a quantity Q defining how many bands in the plurality of bands are needed for a threshold level of information;
ranking each band in the plurality of bands based on a statistical measure;
selecting Q bands from the plurality of bands to generate a subset of bands based on the virtual dimensionality; and
generating an image based on the subset of bands, wherein the statistical measure is information divergence defined as $$D(p; g) = \sum_{i=1}^{N} p_i \log(p_i / g_i) + \sum_{i=1}^{N} g_i \log(g_i / p_i),$$

where p is an image band in the hyperspectral image, and g is a dataset with a Gaussian distribution with a same mean and variance as the image band p.

30. The non-transitory computer-readable storage medium of claim 29, wherein Q is determined by progressive band selection.

31. A non-transitory computer-readable storage medium storing instructions which, when executed by a computing device, cause the computing device to perform progressive band selection for hyperspectral images, the instructions comprising:
calculating a virtual dimensionality of a hyperspectral image containing a plurality of bands to determine a quantity Q defining how many bands in the plurality of bands are needed for a threshold level of information;
ranking each band in the plurality of bands based on a statistical measure;
selecting bands from the plurality of bands to generate a subset of bands based on the virtual dimensionality; and
generating an image based on the subset of bands,
wherein ranking each band is further based on a central moment of each band and wherein the central moment is calculated based on a variance formula $$\sigma^2 = \frac{1}{N-1} \sum_{i=1}^{N} (x_i - \bar{x})^2,$$

where $x_i$ is a value of pixel i, $\bar{x}$ is a mean value of all pixels in the respective band, and N is a number of pixels.

32. The non-transitory computer-readable storage medium of claim 31, wherein Q is determined by progressive band selection and wherein selecting bands from the plurality of bands further comprises highest-ranked bands from the plurality of bands.

33. The non-transitory computer-readable storage medium of claim 32, wherein progressive band selection is based on an application-specific performance target.

34. The non-transitory computer-readable storage medium of claim 32, wherein progressive band selection comprises at least one of progressive band expansion, progressive band reduction, and binary bisection band selection.

35. A non-transitory computer-readable storage medium storing instructions which, when executed by a computing device, cause the computing device to perform progressive band selection for hyperspectral images, the instructions comprising:
calculating a virtual dimensionality of a hyperspectral image containing a plurality of bands to determine a quantity Q defining how many bands in the plurality of bands are needed for a threshold level of information;
ranking each band in the plurality of bands based on a statistical measure;
selecting Q bands from the plurality of bands to generate a subset of bands based on the virtual dimensionality; and
generating an image based on the subset of bands,
wherein ranking each band is further based on a central moment of each band and wherein the central moment is calculated based on a skewness formula $$\text{skewness} = \frac{1}{N-1} \sum_{i=1}^{N} \frac{(x_i - \bar{x})^3}{\sigma^3},$$

where $\sigma$ is a standard deviation of all pixels in the respective band, $x_i$ is a value of pixel i, $\bar{x}$ is a mean value of all pixels in the respective band, and N is a number of pixels.

36. The non-transitory computer-readable storage medium of claim 35, wherein is determined by progressive band selection and wherein selecting Q bands from the plurality of bands further comprises selecting highest-ranked bands from the plurality of bands.

37. The non-transitory computer-readable storage medium of claim 36, wherein progressive band selection is based on an application-specific performance target.

38. The non-transitory computer-readable storage medium of claim 36, wherein progressive band selection comprises at least one of progressive band expansion, progressive band reduction, and binary bisection band selection.

39. A non-transitory computer-readable storage medium storing instructions which, when executed by a computing device, cause the computing device to perform progressive band selection for hyperspectral images, the instructions comprising:
calculating a virtual dimensionality of a hyperspectral image containing a plurality of bands to determine a quantity Q defining how many bands in the plurality of bands are needed for a threshold level of information;
ranking each band in the plurality of bands based on a statistical measure;
selecting Q bands from the plurality of bands to generate a subset of bands based on the virtual dimensionality; and
generating an image based on the subset of bands,
wherein ranking each band is further based on a central moment of each band and wherein the central moment is calculated based on a kurtosis formula $$\text{kurtosis} = \frac{1}{N-1} \sum_{i=1}^{N} \frac{(x_i - \bar{x})^4}{\sigma^4},$$

where $\sigma$ is a standard deviation of all pixels in the respective band, $x_i$ is a value of pixel i, $\bar{x}$ is a mean value of all pixels in the respective band, and N is a number of pixels.

40. The non-transitory computer-readable storage medium of claim 39, wherein Q is determined by progressive band selection and wherein selecting Q bands from the plurality of bands further comprises selecting highest-ranked bands from the plurality of bands.

41. The non-transitory computer-readable storage medium of claim 40, wherein progressive band selection is based on an application-specific performance target.

42. The non-transitory computer-readable storage medium of claim 40, wherein progressive band selection comprises at least one of progressive band expansion, progressive band reduction, and binary bisection band selection.

* * * * *